M. A. PAULSON & C. FREDERICKSON.
SAFETY CLUTCH FOR FEED CUTTERS.
APPLICATION FILED MAR. 3, 1915.
1,168,110.
Patented Jan. 11, 1916.
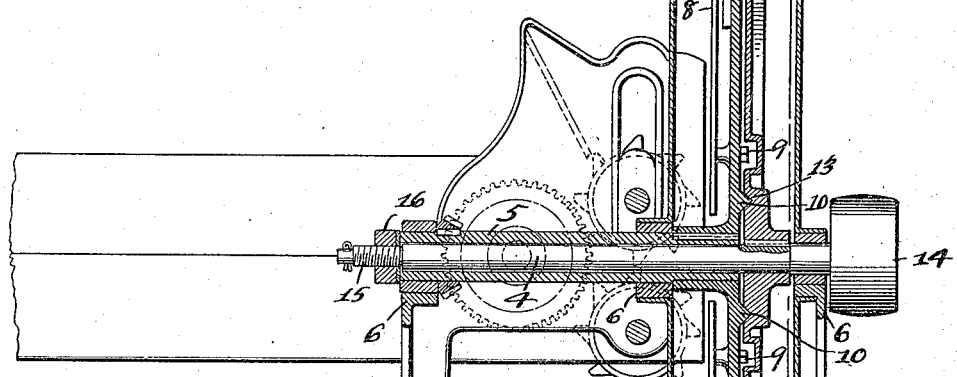
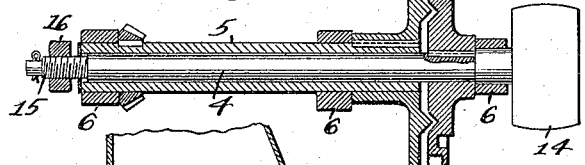
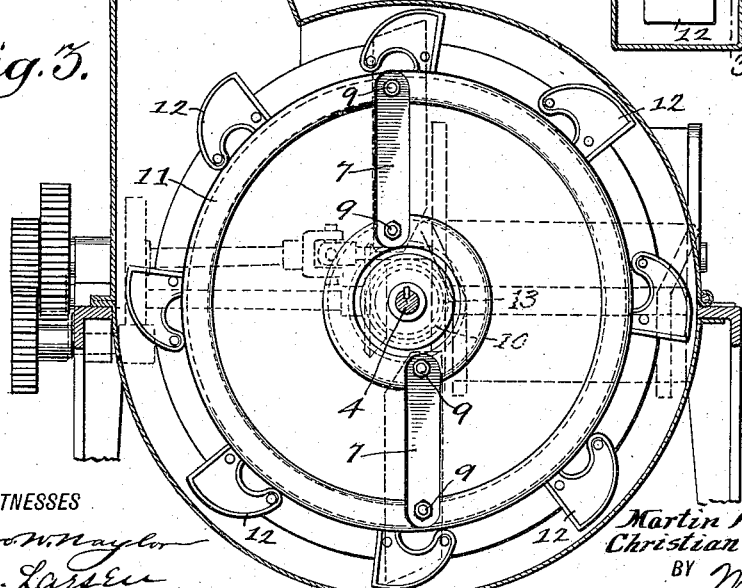
WITNESSES
INVENTORS
Martin A. Paulson
Christian Frederickson
BY
ATTORNEYS

UNITED STATES PATENT OFFICE.

MARTIN A. PAULSON AND CHRISTIAN FREDERICKSON, OF RICE LAKE, WISCONSIN.

SAFETY-CLUTCH FOR FEED-CUTTERS.

1,168,110.     Specification of Letters Patent.     Patented Jan. 11, 1916.

Application filed March 3, 1915. Serial No. 11,689.

*To all whom it may concern:*

Be it known that we, MARTIN A. PAULSON and CHRISTIAN FREDERICKSON, citizens of the United States, and residents of Rice Lake, county of Barron, and State of Wisconsin, have invented certain new and useful Improvements in Safety-Clutches for Feed-Cutters, of which the following is a specification.

Our invention relates to clutches, and the main object thereof is to provide such devices which are applicable to feed cutters whereby the cutters may be stopped, as by a hard substance in the feed being cut, without affecting the operation of the mechanism for actuating said cutters.

Our invention is fully described in the following specification, of which the accompanying drawings form a part, in which like reference characters refer to like parts in each of the views, and in which:—

Figure 1 is a longitudinal section taken through our invention as applied to a feed cutter, with the parts in cutting position; Fig. 2 is a similar, fragmentary, section thereof with the parts in inoperative position; and Fig. 3 is a section taken on the line 3—3 of Fig. 1.

In the drawings forming a part of this application we have shown a present preferred form of embodiment of our invention, comprising a shaft 4 having a tubular sleeve 5 freely revoluble thereon and also freely rotatable in bearings 6 of any desired type or class.

Keyed on the sleeve 5 is a disk 7 carrying the cutter blades 8 held thereon in any desired manner, by bolts and nuts 9 in the manner illustrated, and we provide a rib 10 on the surface of the disk 7 opposite the blades 8, this rib being arranged concentric with the shaft 4 and being, preferably, of triangular form in cross section, as shown in Figs. 1 and 2.

Keyed on the shaft 4 is a blower disk 11 having a plurality of fans 12 on the periphery thereof of any desired type, said disk 11 being recessed in the positions of the bolts and nuts 9 in order that the disks 7 and 11 may closely approach each other, and the disk 11 is also provided with a channel 13 in the position of the rib 10 on the disk 7, and preferably of the same formation, and into which channel said rib is adapted to enter and be engaged to frictionally hold the disks 7 and 11 in operative engagement.

The shaft 4 carries a pulley 14 at one end thereof whereby it may be rotated to revolve the fans, this being a constant operation while the device is in action, and said shaft is provided with a reduced, screw-threaded, member 15 at its opposite end and upon which is mounted a nut 16 adapted to bear against the outer end of the sleeve 5 and force the sleeve and shaft endwise of each other and thus force the disks 7 and 11 into frictional engagement.

The screw-thread on the shaft member 15 is either right or left hand, according to the direction of movement of the shaft 4, being left hand in the form shown where the fan disk 11 revolves clock-wise in Fig. 3, the object of which is to cause said nut 16 to move outwardly of the main portion of the shaft 4, through its frictional engagement with the end of the sleeve 5, when the revolution of the cutter disk 7 is prevented for any reason, and thus disengage the frictional engagement of the rib 10 in the channel 13 and render the cutter disk 7 inoperative, the disengaged position of the disks being shown in Fig. 2.

In practice, if a hard substance, such as a stone, wrench or other tool, pitch-fork, or other implement, should pass into the path of the cutter blades, the revolution of the cutter disk 7 would be prevented, but the shaft 4 would still be enabled to rotate; this obstruction to the revolution of the cutter disk would cause the nut 16 to unwind on its supporting shaft member 15, and no breakage of the parts of the device could occur, nor would the operator be subjected to the danger of accident. As soon as the operator stops the machine and removes the obstruction, he may again and instantly tighten the nut 16, thereby binding the disks 7 and 11 into frictional engagement, and the normal operation of the device may be resumed, and it will be noted that the nut 16 which renders the cutter blades operative or inoperative is entirely removed from the danger zone of the blades, thus precluding the possibility of accident to the operator. The tendency of all persons having the provision, installation, and maintenance in charge is toward the safety of employees, and it will be seen that our invention meets all possible requirements in this respect, and, while we have shown a specific construction, and illustrated in part a specific cutter, we do not confine ourselves thereto, but may adapt the invention to any type of cutter, and may make such structural changes over the form shown as will be necessary to adapt the invention to other types, and still be within the scope of the following claims and the spirit of our invention.

Having fully described our invention, what we claim as new, and desire to secure by Letters Patent, is:—

1. A device of the class described, comprising a shaft, a sleeve independently rotatable thereon, supports therefor, a disk on said sleeve provided with a rib concentric with said shaft, a disk on said shaft provided with a channel concentric with said shaft and adapted to receive said rib, and means displaceable by retardation of said first named disk for normally holding said disks in frictional contact to insure simultaneous revolution thereof.

2. A device of the class described, comprising a shaft, a sleeve independently rotatable thereon, supports therefor, a disk on said sleeve provided with a rib concentric with said shaft, a disk on said shaft provided with a channel concentric with said shaft adapted to receive said rib, said shaft having a screw-thread thereon in the direction of shaft rotation, a nut engaged by said screw-thread and bearing on the corresponding end of said sleeve to force said disks into frictional contact to insure revolution thereof as a unit, a retardation of said first named disk holding said nut immovable with respect thereto during the continued rotation of said shaft to unscrew said nut on said shaft and destroy the frictional engagement of said disks.

In testimony whereof we have signed our names to this specification in the presence of two subscribing witnesses.

MARTIN A. PAULSON.
CHRISTIAN FREDERICKSON.

Witnesses:
WALTER J. ACKERMAN,
H. F. BOOST.

Copies of this patent may be obtained for five cents each, by addressing the "Commissioner of Patents, Washington, D. C."